United States Patent
Kwok et al.

(10) Patent No.: US 11,659,474 B2
(45) Date of Patent: May 23, 2023

(54) INTELLIGENT SELECTION BETWEEN SINGULAR AND DUAL CONNECTIVITY

(71) Applicant: T-Mobile USA, Inc., Bellevue, WA (US)

(72) Inventors: Ming Shan Kwok, Seattle, WA (US); Wafik Abdel Shahid, Kenmore, WA (US); Yasmin Karimli, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 617 days.

(21) Appl. No.: 16/367,166

(22) Filed: Mar. 27, 2019

(65) Prior Publication Data

US 2020/0314729 A1    Oct. 1, 2020

(51) Int. Cl.
*H04W 48/06*   (2009.01)
*H04W 76/15*   (2018.01)
*H04W 48/18*   (2009.01)
*H04W 52/02*   (2009.01)
*H04W 48/20*   (2009.01)

(52) U.S. Cl.
CPC ........... *H04W 48/06* (2013.01); *H04W 48/18* (2013.01); *H04W 48/20* (2013.01); *H04W 52/0277* (2013.01); *H04W 76/15* (2018.02)

(58) Field of Classification Search
CPC . H04W 28/02; H04W 52/0277; H04W 36/14; H04W 48/18; H04W 48/20; H04W 76/15; H04W 40/12

See application file for complete search history.

(56) References Cited

U.S. PATENT DOCUMENTS

| 2017/0251411 A1 | 3/2017 | Kang et al. |
| 2018/0145818 A1 | 5/2018 | Choi et al. |
| 2018/0242209 A1 | 8/2018 | Xu et al. |
| 2018/0368016 A1 | 12/2018 | Lee et al. |

(Continued)

FOREIGN PATENT DOCUMENTS

| KR | 20190014696 | 2/2019 |
| WO | WO2015161817 A1 | 10/2015 |

(Continued)

OTHER PUBLICATIONS

Apple Inc., "Single Tx switched UL support for EN-DC with LTE TDD PCell", R1-1900755, 3GPP TSG RAN WG1 Ad-Hoc Meeting 1901, Taipei, Taiwan, Jan. 12, 2019, pp. 1-5. (Year: 2019).*

(Continued)

*Primary Examiner* — Romani Ohri
(74) *Attorney, Agent, or Firm* — Lee & Hayes, P.C.

(57) ABSTRACT

Systems, devices, and techniques described herein relate to intelligently selecting a connectivity mode. At least one first network characteristic of a first radio link utilizing a first radio technology may be determined. A connectivity mode may be selected based on the at least one first network characteristic. The connectivity mode can be selected from among a dual connectivity mode utilizing the first radio link and a second radio link utilizing a second radio technology, a first single connectivity mode utilizing the first radio link, and a second single connectivity mode utilizing the second radio link. The device may be connected to the first radio link and/or the second radio link according to the selected connectivity mode.

20 Claims, 7 Drawing Sheets

(56) References Cited

U.S. PATENT DOCUMENTS

| | | | |
|---|---|---|---|
| 2019/0069229 A1 | 2/2019 | Lee et al. | |
| 2019/0081657 A1 | 3/2019 | Zeng et al. | |
| 2019/0141538 A1 | 5/2019 | Jones | |
| 2019/0157701 A1* | 5/2019 | Lu | H01M 4/0404 |
| 2019/0158137 A1* | 5/2019 | Brunel | H04B 1/04 |
| 2019/0166536 A1 | 5/2019 | Kim et al. | |
| 2019/0166549 A1* | 5/2019 | Ahmavaara | H04W 76/16 |
| 2019/0208530 A1* | 7/2019 | Gao | H04W 72/12 |
| 2020/0053616 A1 | 2/2020 | Zhu et al. | |
| 2020/0053811 A1 | 2/2020 | Ang et al. | |
| 2020/0077290 A1 | 3/2020 | Shi | |
| 2020/0092210 A1 | 3/2020 | Thanneeru et al. | |
| 2020/0169998 A1* | 5/2020 | Kim | H04W 72/0446 |
| 2020/0170022 A1 | 5/2020 | Jones | |
| 2020/0187226 A1 | 6/2020 | Choi et al. | |
| 2020/0280524 A1 | 9/2020 | Guo et al. | |
| 2020/0280901 A1* | 9/2020 | Na | H04W 76/15 |
| 2020/0322854 A1* | 10/2020 | Ryoo | H04W 36/0085 |
| 2020/0396785 A1 | 12/2020 | Cao | |
| 2021/0022073 A1 | 1/2021 | Kwok et al. | |
| 2021/0076226 A1 | 3/2021 | Nakayama | |
| 2021/0282077 A1 | 9/2021 | Wei et al. | |

FOREIGN PATENT DOCUMENTS

| | | |
|---|---|---|
| WO | WO2017097349 A1 | 6/2017 |
| WO | WO2019088364 A1 | 5/2019 |
| WO | WO2019106050 A1 | 6/2019 |

OTHER PUBLICATIONS

3GPP; Technical Specification Group Radio Access Network; Evolved Universal Terrestrial Radio Access (E-UTRA) and NR; Multi-connectivity; Stage 2 (Release 15), vol. RAN WG2, No. VI5.6.0, Jun. 28, 2019, pp. 1-69.

The Extended European Search Report dated Dec. 9, 2020 for European Patent Application No. 20181710.3, 14 pages.

Office Action for U.S. Appl. No. 16/516,703, dated Mar. 4, 2021, Kwok, "Selecting Among Various Dual Connectivity and Single Connectivity Configurations", 9 Pages.

Apple Inc., "Single Tx switched UL support for EN-DC with LTE TDD PCell", R1-1900755, 3GPP TSG RAN WG1 Ad-Hoc Meeting 1901, Taipei, Taiwan, Jan. 12, 2019, pp. 1-5.

The PCT Search Report and Written Opinion dated Jul. 6, 2020 for PCT Application No. PCT/US2020/023098, 11 pages.

Office Action for U.S. Appl. No. 16/516,703, dated Sep. 23, 2021, Kwok, "Selecting Among Various Dual Connectivity and Single Connectivity Configurations", 11 pages.

The International Preliminary Report on Patentability for PCT Application No. PCT/US20/23098, dated Oct. 7, 2021, 8 pgs.

Office Action for U.S. Appl. No. 16/516,703, dated Jul. 16, 2021, Kwok, "Selecting Among Various Dual Connectivity and Single Connectivity Configurations", 11 pages.

European Office Action dated May 12, 2022 for European Patent Application No. 20181710.3, a foreign counterpart to U.S. Appl. No. 16/516,703, 10 pages.

Office Action for U.S. Appl. No. 16/516,703, dated Nov. 12, 2021, Kwok, "Selecting Among Various Dual Connectivity and Single Connectivity Configurations,", 11 pages.

* cited by examiner

INTELLIGENT SELECTION BETWEEN SINGULAR AND DUAL CONNECTIVITY

BACKGROUND

Modern terrestrial telecommunication systems include heterogeneous mixtures of $2^{nd}$, $3^{rd}$, and $4^{th}$ Generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Moving forward, future telecommunications systems may include $5^{th}$ Generation (5G) cellular-wireless access technologies, among other forthcoming technologies, to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
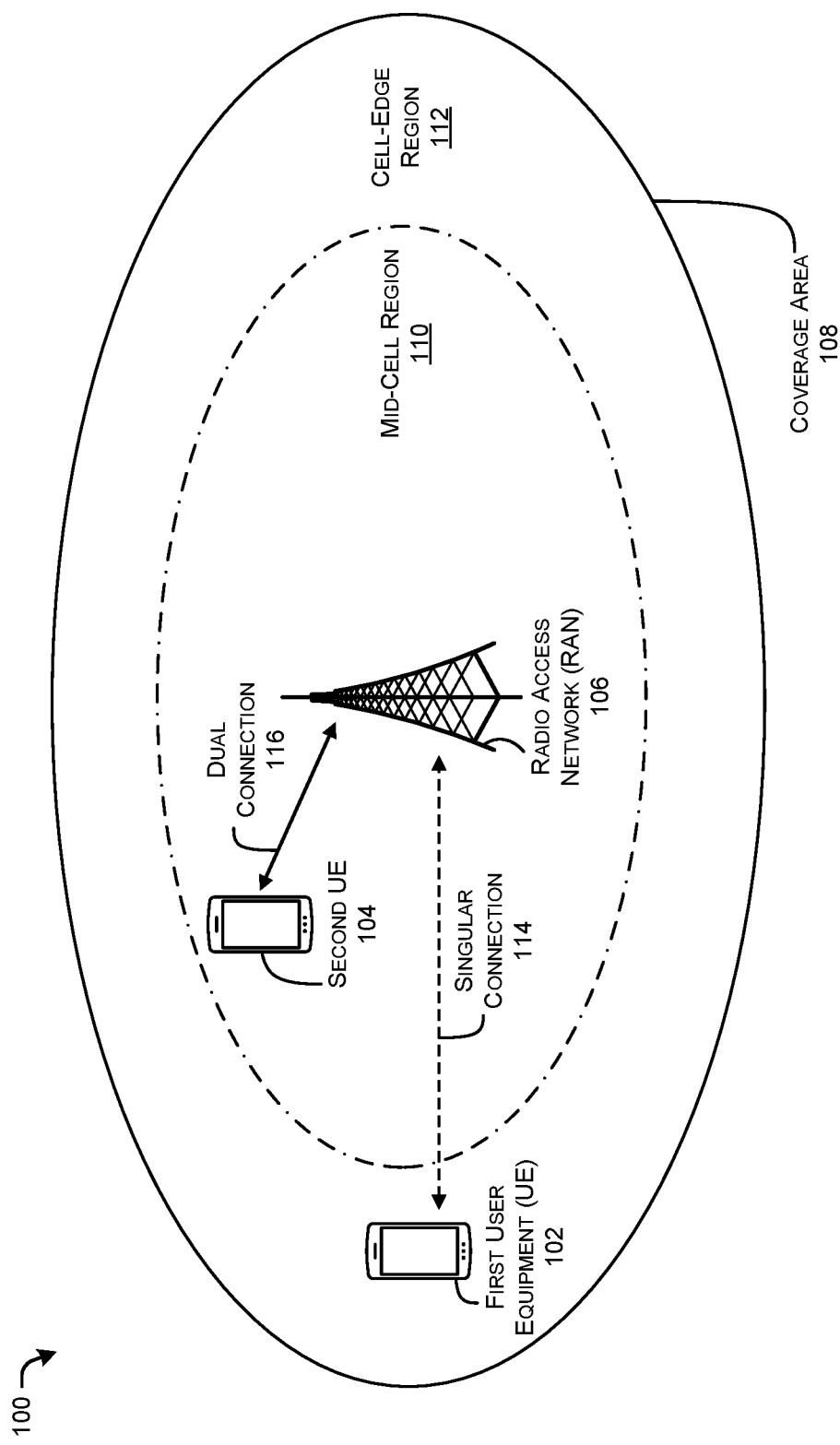
FIG. 1 illustrates an example environment implementing intelligent selection between dual and single connectivity modes according to various implementations of the present disclosure.

The systems, devices, and techniques described herein relate to intelligently selecting between a single connectivity mode and a dual connectivity mode. The type of connectivity mode may be selected according to various characteristics of available radio links and/or various characteristics of devices connecting to the available radio links.

As $5^{th}$ Generation (5G) and other next-generation telecommunication technologies are being developed, individual devices may be capable of connecting to multiple radio links associated with multiple radio access technologies, simultaneously. For example, in some Non-Standalone (NSA) 5G architectures, a $4^{th}$ Generation (4G)- and 5G-capable device may attach to a Radio Access Network (RAN) capable of transmitting data to the device over a 4G radio link and a 5G radio link. Some $3^{rd}$ Generation Partnership Project (3GPP) specifications indicate that the RAN should automatically instruct the device to automatically enter a dual connectivity mode with both the 4G radio link and the 5G radio link in response to learning that the device is 4G- and 5G-capable. In the dual connectivity mode, a split radio bearer including both the 4G radio link and the 5G radio link may be established with the device, such that the device can transmit uplink data and receive downlink data over both the 4G radio link and the 5G radio link.

In ideal conditions, the dual connectivity mode increases bandwidth and data throughput between the RAN and the device. However, there are some circumstances in which the dual connectivity mode can lower an overall user experience associated with the device, as compared to a single connectivity mode (with just the 4G radio link or with just the 5G radio link). For example, if the 4G radio link is significantly congested and the 5G radio link is relatively uncongested, a higher number of data retransmissions may be required, a longer queuing delay may occur, and/or a greater number of packets may be lost when data is transmitted over the split bearer in the dual connectivity mode than if the data was transmitted over the 5G radio link in the single connectivity mode. In some instances, in which the device is located in a cell-edge region and is limited to an allocated transmission power that has to be split across both the 4G radio link and the 5G radio link, the device may be unable to reliably transmit uplink data over both the 4G radio link and the 5G radio link with the split transmission power. In some cases, in which the device is relatively low on power, the dual connectivity mode may impose a significant drain on a battery in the device, which can negatively impact the user experience by potentially interrupting other functions of the device.

According to various implementations of the present disclosure, a connectivity mode can be intelligently selected to maximize user experience. In particular implementations, a selection between a singular connectivity mode and a dual connectivity mode can be based, at least in part, on one or more network characteristics and/or one or more device characteristics. The selection can be performed by a RAN, by a device attached to the RAN, by a separate device controlling the RAN, or a combination thereof.

In particular implementations, the RAN may determine the network characteristic(s). For instance, the RAN may calculate a congestion level, latency, and/or capacity associated with the 4G radio link and/or the 5G radio link. In certain implementations, the device attached to the RAN can report the device characteristic(s) to the RAN. For example, the device may transmit a report indicating a transmission power of a wireless signal received by the device from the RAN, a battery level of the device, a processing load on the device, an indication of whether the device is 5G-capable, a dynamic power sharing condition of the device, and the like. Based at least in part on the network characteristic(s) determined by the RAN and/or the device characteristic(s) reported by the device, the RAN can calculate metrics indicating predicted user experiences for the device in a dual connectivity mode with the 4G radio link and the 5G radio link, in a single connectivity mode with the 4G radio link, and a single connectivity mode with the 5G radio link.

In particular implementations, the RAN may select the best connectivity mode for the device according to the user experience metrics. In some cases, the device may select the connectivity mode based, at least in part, on the device characteristics. The RAN and the device may establish the selected connectivity mode and may exchange data wirelessly using the selected connectivity mode.

When the dual connectivity mode is implemented, particular implementations of the present disclosure include intelligently selecting one or more transmission intervals in order to maximize user experience. In some examples, the RAN and/or the device may schedule a transmission interval for the 4G radio link and a transmission interval for the 5G radio link to at least partially overlap, or to be staggered in the time domain, based on the network characteristic(s) and/or the device characteristic(s). For instance, if the battery of the device is substantially depleted, the RAN and/or the device may schedule the transmission intervals to be staggered in the time domain in order to conserve power. The RAN and/or the device may further transmit and/or receive data in accordance with the scheduled transmission intervals.

Various implementations of the present disclosure improve the technological field of telecommunications. Intelligent connection mode selection can maximize user experience compared to previously specified technologies, in which the dual connection mode is always selected whenever available. Particular implementations disclosed herein can ensure that a RAN and a device implement a connectivity mode associated with the highest throughput, lowest error rate, lowest latency, and/or the lowest retransmission rate, among multiple connectivity modes available to the RAN and the device. Certain implementations can ensure that the RAN and the device implements a connectivity mode that can conserve power when a battery level of the device is relatively depleted. Accordingly, various implementations improve the user experience associated with the device.

Furthermore, intelligent connection mode selection can improve telecommunication networks. In some cases, a connectivity mode associated with the lowest retransmission rate among multiple connectivity modes is selected and implemented. As a result, unnecessary retransmissions between the RAN and the device can be prevented. By reducing the retransmission rate, network capacity can be increased. Accordingly, various implementations of the present disclosure improve the overall functioning of telecommunication networks.

Intelligent transmission interval scheduling can further improve the user experience associated with the device. In some implementations, a transmission interval can be scheduled to selectively conserve the battery level of the device when the battery level is relatively depleted. Alternatively, the transmission interval can be scheduled to selectively prioritize throughput when the battery level is relatively high. Accordingly, certain implementations of the intelligent transmission interval scheduling can appropriately balance different user experience factors based on changing conditions of the device.

Various implementations can be practically applied to real-world telecommunication networks. In particular, implementations include devices, systems, and methods that can be applied to transmitting and receiving data wirelessly over heterogenous networks. Certain implementations can further be used to conserve wireless resource and power in real-world telecommunications environments.

FIG. 1 illustrates an example environment 100 implementing intelligent selection between dual and single connectivity modes according to various implementations of the present disclosure.

As illustrated, environment 100 includes a first User Equipment (UE) 102 and a second UE 104. The terms "user equipment (UE)," "user device," "wireless communication device," "wireless device," "communication device," "mobile device," and "client device," can be used interchangeably to describe any UE (e.g., the first UE 102 and/or the second UE 104) that is capable of transmitting/receiving data wirelessly using any suitable wireless communications/data technology, protocol, or standard, such as Global System for Mobile communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), CBRS, and/or any future Internet Protocol (IP)-based network technology or evolution of an existing IP-based network technology.

Examples of UEs (e.g., the first UE 102 and/or the second UE 104) can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of UEs include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network.

Any of the first UE 102 and the second UE 104 may be capable of supporting 4G radio communications, such as LTE radio communications, and 5G radio communications, such as New Radio (NR) communications. In some examples, either or both of the first UE 102 and the second UE 104 may be configured to support at least one of enhanced Mobile Broadband (eMBB) communications, Ultra Reliable Low Latency Communications (URLLCs), or massive Machine Type Communications (mMTCs). In some instances, the one or more devices can include at least one device supporting one or more of a sensor network, voice services, smart city cameras, gigabytes-in-a-second communications, 3D video, 4K screens, work & play in the cloud, augmented reality, industrial and/or vehicular automation, mission critical broadband, or self-driving cars.

Environment 100 further includes a Radio Access Network (RAN) 106 associated with a coverage area 108. The terms "RAN," "base station," "Access Point (AP)," or their equivalents, can refer to one or more devices that can transmit and/or receive wireless services to and from one or more UEs in a coverage area. For example, a RAN can be implemented as a variety of technologies to provide wired and/or wireless access to the network, as discussed herein. In some instances, a RAN can include a $3^{rd}$ Generation Partnership Project (3GPP) RAN, such a GSM/EDGE RAN (GERAN), a Universal Terrestrial RAN (UTRAN); and/or an Evolved UTRAN (E-UTRAN), or alternatively, a "non-3GPP" RAN, such as a Wi-Fi RAN, or another type of wireless local area network (WLAN) that is based on the IEEE 802.11 standards. Further, a RAN can include any number and type of transceivers and/or base stations representing any number and type of macrocells, microcells, picocells, or femtocells, for example, with any type or amount of overlapping coverage or mutually exclusive coverage.

In particular implementations, the coverage area 108 can correspond to a geographic region where wireless communications are supported by the RAN 106. For example, the coverage area 108 is a region where the RAN 106 can transmit and/or receive data wirelessly with other devices.

The RAN 106 may be capable of transmitting and/or receiving data wirelessly using a first radio technology and a second radio technology. As used herein, the term "radio technology" can refer to a type, technique, specification, or protocol by which data is transmitted wirelessly. In some cases, a radio technology can specify which frequency bands are utilized to transmit data. For instance, a "5G radio technology" can refer to the NR standard, as defined by 3GPP. In some cases, a "4G radio technology" can refer to the LTE radio standard, as defined by 3GPP.

In particular examples, the RAN 106 can utilize a 4G radio technology. The RAN 106 may transmit and receive data with a device located in the coverage area 108 over at least one first radio link (e.g., at least one LTE radio link) that is defined according to frequency bands included in, but not limited to, a range of 450 MHz to 5.9 GHz. In some instances, the frequency bands utilized for the first radio link(s) by the first RAN 106 can include, but are not limited to, LTE Band 1 (e.g., 2100 MHz), LTE Band 2 (1900 MHz), LTE Band 3 (1800 MHz), LTE Band 4 (1700 MHz), LTE Band 5 (850 MHz), LTE Band 7 (2600 MHz), LTE Band 8 (900 MHz), LTE Band 20 (800 MHz GHz), LTE Band 28 (700 MHz), LTE Band 38 (2600 MHz), LTE Band 41 (2500 MHz), LTE band 48 (e.g., 3500 MHz), LTE Band 50 (1500 MHz), LTE Band 51 (1500 MHz), LTE Band 66 (1700 MHz), LTE Band 70 (2000 MHz), LTE Band 71 (e.g., a 600 MHz band), LTE Band 74 (1500 MHz), and the like. In some examples, the first RAN 106 can be, or at least include, an eNodeB that can connect to devices in the coverage area 108 via the first radio link(s).

In some instances, the RAN 106 can also utilize a 5G radio technology, such as technology specified in the 5G NR standard, as defined by 3GPP. In certain implementations, the RAN 106 can transmit and receive communications with devices located in the coverage area 108 over at least one second radio link (e.g., at least one NR radio link) that is defined according to frequency resources including "millimeter wave" bands including, but not limited to 26 GHz, 28 GHz, 39 GHz, 60 GHz, and the like. In some embodiments, the RAN 106 can be, or at least include, a gNodeB that can connect to devices in the coverage area 108 via the second radio link(s).

In some implementations, the RAN 106 is part of a Non-Standalone (NSA) architecture. For instance, the RAN 106 may include both a 4G transceiver (e.g., an eNodeB) by which the RAN 106 can establish LTE radio link(s) and a 5G transceiver (e.g., a gNodeB) by which the RAN 106 can establish NR radio link(s). In some cases, functions (e.g., transmission intervals, transmission power, etc.) of the 4G transceiver and the 5G transceiver are coordinated by the RAN 106.

According to various implementations, the RAN 106 may communicate with a core network (not illustrated) that can include a 4G core network (e.g., an Evolved Packet Core (EPC)) and/or a 5G core network. Services may be relayed between the core network(s) and a device in the coverage area 108 by the RAN 106 via the first radio link(s) and/or the second radio link(s). In some cases, the core network can provide the services, in turn, to and from at least one Wide Area Network (WAN) (such as the Internet), an Internet Protocol (IP) Media Subsystem (IMS) network, and the like. In various implementations, the services can include voice services, data services, and the like.

The coverage area 108 may be divided into at least two regions, which are defined according to a distance from the RAN 106, a strength of at least one received signal from the RAN 106, a quality of wireless communications from the RAN 106, sources of attenuation in coverage area 108, and the like. The coverage area 112 may include a mid-cell region (also referred to as a "near-cell region") 110 and a cell edge region 112. In some instances, the mid-cell region 110 is less than a threshold distance from the RAN 106 and is a region where wireless communication with the RAN 106 is relatively strong. In certain instances, the cell-edge region 112 is more than a threshold distance from the RAN 106 and has an outer boundary that is defined by an outer boundary of the coverage area 108 associated with the RAN 106. In some instances, the cell-edge region 112 is a region where wireless communication with the RAN 106 is weaker than wireless communication in the mid-cell region 110. In some cases, a device's presence in the mid-cell region 110 and/or the cell-edge region 112 can be determined based on a strength (e.g., a power) of a signal received by the device from the RAN 106, based on a strength of a signal received by the RAN 106 from the device, or a combination thereof.

Although not illustrated in FIG. 1, it is possible that the coverage area 108 may be divided into first and second coverage areas corresponding to the first and second radio technologies. The first and second radio technologies may correspond to different transmission frequencies, which may correspond to different levels of frequency-dependent attenuation throughout the coverage area 108. For example, when the first radio technology is an LTE radio technology and the second radio technology is a NR radio technology, the coverage area corresponding to the LTE radio technology can be larger than the coverage area corresponding to the NR radio technology, due to the lower transmission frequencies associated with the LTE radio technology. However, as described with reference to FIG. 1, the first radio link(s) and the second radio link(s) may be assumed to be available throughout the entire coverage area 108.

As illustrated in FIG. 1, each of the first UE 102 and the second UE 104 are located in the coverage area 108. Accordingly, the first UE 102 and the second UE 104 can be capable of transmitting and/or receiving data with the RAN 106 via the first radio link(s) and/or the second radio link(s). In various implementations, data can be exchanged between the RAN 106 and the first UE 102 and/or the second UE 104 via the first radio technology using the first radio link(s) and/or the second radio technology using the second radio link(s). In particular implementations, each of the first UE 102 and the second UE 104 can establish a connectivity mode with the RAN 106 among a dual connectivity mode, in which both the first radio link(s) and the second radio link(s) are used to exchange data; a first single connectivity mode utilizing the first radio link(s) to exchange data without utilizing the second radio link(s); and a second single connectivity mode utilizing the second radio link(s) to exchange data without the first radio link(s).

In various implementations, a connectivity mode among the dual connectivity mode, the first single connectivity mode, and the second single connectivity mode can be intelligently selected for each of the first UE 102 and the second UE 104. Specifically, the connectivity mode for each of the first UE 102 and the second UE 104 can be selected to maximize expected user experience. In some cases, the selection can be performed by the RAN 106 or by a system connected to the RAN 106 (e.g., a device in the core network connected to the RAN 106 and one or more other RANs in a larger telecommunication network). In some cases, the first UE 102 and the second UE 104 can each intelligently select connectivity modes for themselves.

In particular implementations, the connectivity mode can be intelligently selected according to at least one network characteristic associated with the RAN 106. As used herein, the terms "network characteristic," "network condition," and their equivalents, can refer to a characteristic that is specific to a particular radio link, to a particular RAN, to a core network connected to the particular RAN, or to a WAN connected to the particular RAN. RAN 106 may be configured to determine the network characteristic(s). In some cases in which a device other than the RAN 106 performs intelligent connectivity mode selection, the RAN 106 may transmit an indication of the network characteristic(s) to the device.

In various examples, the network characteristic(s) determined by the RAN 106 may include at least one of an available capacity, a congestion level, a latency, and an allocated transmission power. The network characteristic(s) may be characteristic(s) of the first radio link(s) and the second radio link(s). For instance, the network characteristic(s) may include a congestion level associated with the first radio link(s) and a congestion level associated with the second radio link(s).

In particular implementations, the connectivity mode for the first UE 102 and the connectivity mode for the second UE 104 can be selected based, at least in part, on the network characteristic(s). The network characteristic(s) may indicate an expected user experience for the first UE 102 in the dual connectivity mode and an expected user experience for the first UE 102 in either of the single connectivity modes. The network characteristic(s) may further indicate an expected user experience for the second UE 104 in the dual connectivity mode and an expected user experience for the second UE 104 in either of the single connectivity modes. In specific examples, if the congestion level associated with the second radio link(s) is above a particular threshold, a connectivity mode that utilizes the second radio link(s) may be associated with a lower user experience than a connectivity mode that does not utilize the first radio link(s). Although not illustrated, in these examples, the first single connectivity mode may be selected for both the first UE 102 and the second UE 104, so that communication over the congested second radio link(s) can be avoided.

In particular implementations, the connectivity mode for the first UE 102 can be intelligently selected according to at least one device characteristic associated with the first UE 102, and the connectivity mode for the second UE 104 can be intelligently selected according to at least one device characteristic associated with the second UE 104. As used herein, the terms "device characteristic," "device condition," and their equivalents, can refer to a feature specific to a device at a particular time. In some implementations, a device characteristic can include any of a radio condition experienced by the device, a location of the device, a trajectory of the device, a dynamic power sharing condition of the device, a battery level of the device, or a processing load on the device. In some instances, a device characteristic can include a distance between the device and a RAN. For example, a device characteristic can include whether the device is in a mid-cell region or a cell-edge region of the RAN.

Referring back to FIG. 1, a single connectivity mode may be selected for the first UE 102, since the first UE 102 is located in the cell-edge region 112. In particular implementations, the first UE 102 can determine a power of a wireless signal received from the RAN 106. In some cases, the first UE 102 and/or the RAN 106 can determine that the first UE 102 is in the cell-edge region 112 when the power is less than a particular threshold. Due to sources of attenuation and interference between the RAN 106 and the cell-edge region 112, a relatively high number of retransmissions may be expected between the RAN 106 and devices in the cell-edge region 112. These retransmissions can detrimentally affect network capacity. In order to reduce the number of retransmissions and improve network capacity, the single connectivity mode may be selected for the first UE 102 when the first UE 102 is located in the cell-edge region 112.

Accordingly, a singular connection 114 can be established between the first UE 102 and the RAN 106. The singular connection 114 may include at least one of the first radio link(s) or at least one of the second radio link(s).

On the other hand, the dual connectivity mode may be selected for the second UE 104, since the second UE 104 is located in the mid-cell region 110. In particular implementations, the second UE 104 and/or the RAN 106 can determine that a power of a signal received by the second UE 104 from the RAN 106 exceeds a particular threshold, and may therefore determine that the second UE 104 is located in the mid-cell region 110. Due to relatively few sources of attenuation and interference between the RAN 106 and the mid-cell region 110, few retransmissions may be expected between the RAN 106 and devices in the mid-cell region 110. In order to increase throughput between the RAN 106 and the second UE 104, the dual connectivity mode may be selected for the second UE 104 when the second UE 104 is located in the mid-cell region 110.

Accordingly, a dual connection 116 can be established between the second UE 104 and the RAN 106. The dual connection 116 may include at least one of the first radio link(s) and at least one of the second radio link(s).

Although intelligent connectivity mode selection can depend on a comparison between a threshold and a single network characteristic or a single device characteristic (as described above), in some cases, a connectivity mode can be selected based on multiple network and/or device characteristics. In certain implementations, metrics indicating expected user experiences associated with available connectivity modes can be calculated based on multiple network and/or device characteristics and compared to each other. The connectivity mode associated with the highest user experience metric can be selected.

The environment 100 can further implement intelligent transmission interval scheduling, in some cases. In particular implementations, since the dual connectivity mode has been selected for the second UE 104, at least one transmission interval associated with the first radio link(s) or the second radio link(s) is intelligently scheduled according to the network characteristic(s) and/or the device characteristic(s). For instance, if a battery level of the second UE 104 is determined to be below a particular threshold, a transmission interval for the first radio link(s) may be scheduled to be staggered with a transmission interval for the second radio link(s) in the time domain. Accordingly, the battery level of the second UE 104 can be conserved when the battery of the second UE 104 is relatively depleted. However, if the battery level of the second UE 104 is determined to exceed the particular threshold, the transmission interval for the first radio link(s) may be scheduled to at least partially overlap with the transmission interval for the second radio link(s) in the time domain. Accordingly, data throughput between the RAN 106 and the second UE 104 can be prioritized when the second UE 104 has a relatively large amount of stored battery power. The intelligent transmission interval scheduling for the second UE 104 can be performed by the RAN 106, by a device controlling the RAN 106, by the second UE 104, or a combination thereof.

As may be understood, the environment 100 may be implemented in accordance with any one of Option 3, 3a, 3x, 4, 4a, 7, 7a, and/or 7x, as defined by 3GPP. That is, the environment 100 may include a 5G core and/or may include additional data-plane or control-plane signaling. In general, the techniques discussed herein may be implemented in any dual connectivity or multi connectivity environment.

According to various implementations, the environment 100 can intelligently select connectivity modes for devices connected to the RAN 106 in order to maximize user experience. Furthermore, the environment 100 can intelligently schedule transmission intervals for dual connections in order to maximize user experience.

Figure 2:
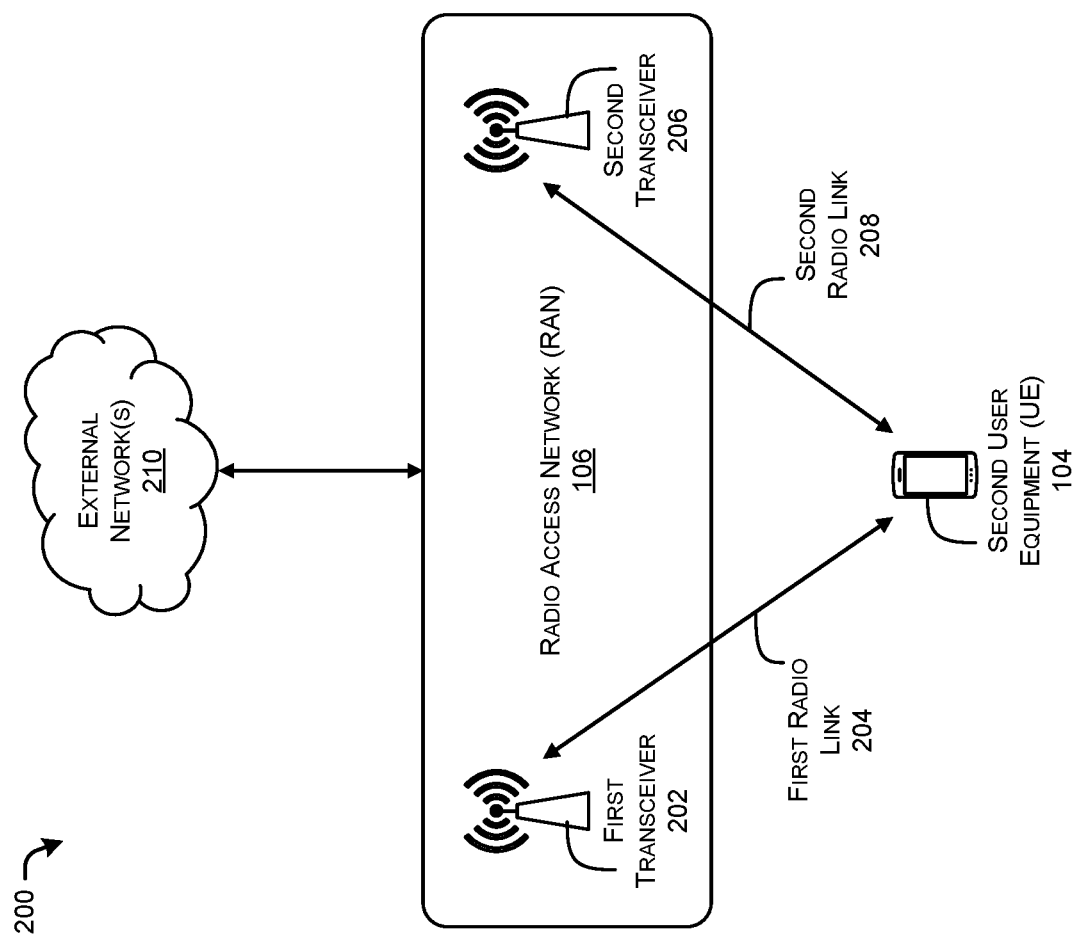
FIG. 2 illustrates an environment in which a User Equipment (UE) and a Radio Access Network (RAN) are in the dual connectivity mode according to some implementations.

FIG. 2 illustrates an environment 200 in which the second User Equipment (UE) 104 and the Radio Access Network (RAN) 106 are in the dual connectivity mode according to some implementations.

As illustrated in FIG. 2, the RAN 106 includes a first transceiver 202 configured to exchange data wirelessly with the second UE 104 via a first radio link 204 and a second transceiver 206 configured to exchange data wirelessly with the second UE 104 via a second radio link. 208.

In some cases, the second UE 104 can transmit uplink data simultaneously via the first radio link 204 and the second radio link 208. In some cases, the second UE can transmit uplink data to the RAN 106 via either the first radio link 204 or the second radio link 208 at a particular time. In general, the second UE 104 utilizes more power when the second UE 104 transmits uplink data simultaneously via the first radio link 204 and the second radio link 208 than when the second UE 104 transmits uplink data via either the first radio link 204 or the second radio link 208.

As illustrated in FIG. 2, the RAN 106 may be connected to one or more external networks 210. According to various implementations, the external network(s) 210 include a core network, an Internet Protocol (IP) Media Subsystem (IMS) network, a Wide Area Network (WAN) (such as the Internet), and the like. The RAN 106 may relay data between the second UE 104 and the external network(s) 210. For example, the RAN 106 may forward uplink data from the second UE 104 to the external network(s) 210 and may forward downlink data from the external network(s) 210 to the second UE 104.

In some examples, the core network can include a 4G core network. For instance, the core network may include an Evolved Packet Core (EPC). In some cases, the first core network may include any of a Mobility Management Entity (MME), a Serving Gateway (SGW), a Packet Data Network (PDN) Gateway (PGW), a Home Subscriber Server (HSS), an Access Network Discovery and Selection Function (ANDSF), an evolved Packet Data Gateway (ePDG), a Data Network (DN), and the like.

In some examples, the core network can include a 5G core network. For instance, the core network may include any of an Access and Mobility management Function (AMF), a Session Management Function (SMF), a Policy Control Function (PCF), an Application Function (AF), an Authentication Server Function (AUSF), a Network Slice Selection Function (NSSF), a Unified Data Management (UDM), a Network Exposure Function (NEF), a Network Repository Function (NRF), a User Plane Function (UPF), a DN and the like.

In some instances, the external network(s) 210 include an IMS core (sometimes referred to as an "IMS core network," an "IMS network," a "Core Network (CN)," or an "IM CN Subsystem"). IMS is an architectural framework defined by 3GPP for delivering IP multimedia to a device, such as the first UE 102. The IMS core can be maintained and/or operated by one or more service providers, such as one or more wireless carriers ("carriers"), that provide IMS-based services to a user who is associated with the device. For example, a service provider can offer multimedia telephony services that allow a user to call or message other users via the IMS core using his/her device. A user (e.g., a user of the second UE 104) can also utilize an associated device to receive, provide, or otherwise interact with various different IMS-based services by accessing the IMS core. It is to be appreciated that any number of RANs, such as the RAN 106, and/or IMS nodes can be associated with the IMS network.

An operator of the IMS core can offer any type of IMS-based service, such as, telephony services, emergency services (e.g., Enhanced 911 (E911)), gaming services, instant messaging services, presence services, video conferencing services, social networking and sharing services, location-based services, push-to-talk services, and so on. In order to access these services (e.g., telephony services), a device is configured to request establishment of a communication session. In the case of telephony services, the communication session can comprise a call (e.g., a voice-based communication session, such as a Voice Over LTE (VoLTE) call, or a Wi-Fi call). Accordingly, the second UE 104 may access services from the IMS core by transmitting a request for a communication session as uplink data to the RAN 106 via the first radio link 204 and/or the second radio link 208. The RAN 106 may forward the request to the IMS network among the external network(s) 210.

In some cases, the external network(s) 210 can include one or more core networks. For example, if the first transceiver 202 is a 4G LTE transceiver and the second transceiver 206 is a 5G NR transceiver in a Non-Standalone (NSA) environment, the external network(s) 210 may include a single 4G core network, such as an EPC.

According to various implementations, the RAN 106 and/or the second UE 104 can select a connectivity mode that maximizes a user experience associated with the second UE 104. The connectivity mode may be selected among a dual connectivity mode with both the first radio link 204 and the second radio link 208, a single connectivity mode with the first radio link 204, or a single connectivity mode with the second radio link 208.

In particular implementations, the connectivity mode can be selected based on one or more network conditions. The network condition(s) may include any of a condition associated with the first radio link 204, a condition associated with the second radio link 208, a condition associated with the RAN 106, and a condition associated with the external network(s) 210. In various examples a metric indicating an expected user experience associated with the dual connectivity mode, a metric indicating an expected user experience associated with a single connectivity mode via the first radio link 204, and a metric indicating an expected user experience associated with a single connectivity mode via the second radio link 208 can be calculated. In particular implementations, the connectivity mode associated with the highest metric can be selected.

In some cases, the network condition(s) may include an available capacity of the first radio link 204 and/or an available capacity of the second radio link 208. As used herein, the term "capacity" can refer to an amount of data traffic that at least one network node, at least one network link, or the network itself, can carry at a given time. The term "available capacity" can refer to a difference between the total capacity (e.g., a maximum amount of data traffic a network can handle) and an amount of data traffic being currently handled by the network.

In various implementations, the available capacity of the first radio link 204 can be directly proportional to the metric indicating the user experience associated with the dual connectivity mode and can be directly proportional to the metric indicating the user experience associated with the single connectivity mode via the first radio link 204. In particular implementations, the available capacity of the second radio link 208 is directly proportional to the metric indicating the user experience associated with the dual connectivity mode and is directly proportional to the metric indicating the user experience associated with the single connectivity mode via the second radio link 208. Accordingly, as the available capacity of a radio link increases, the expected user experience of a connectivity mode utilizing the radio link may also increase. However, as the available capacity of a radio link decreases, the expected user experience of a connectivity mode utilizing the radio link may also decrease.

In various instances, the network condition(s) may include a congestion level of the first radio link 204 and/or a congestion level of the second radio link 208. As used herein, the term "congestion" can refer to a state of at least one network node, at least one network link, or the network itself, that is carrying more data than it can handle without a reduced quality of service. Congestion, for example, can cause negative effects such as reduced data throughput, queueing delay, packet loss, and the like. The term "congestion level," as used herein, can refer to an amount of congestion experienced by at last one network node, at least one network link, or the network itself. In some cases, a component's congestion level is inversely proportional to its available capacity.

In various implementations, the congestion level of the first radio link 204 can be inversely proportional to the metric indicating the user experience associated with the dual connectivity mode and can be inversely proportional to the metric indicating the user experience associated with the single connectivity mode via the first radio link 204. In particular implementations, the congestion level of the second radio link 208 can be inversely proportional to the metric indicating the user experience associated with the dual connectivity mode and can be inversely proportional to the metric indicating the user experience associated with the single connectivity mode via the second radio link 208. Accordingly, as the congestion level of a radio link increases, the expected user experience of a connectivity mode utilizing the radio link may decrease. However, as the congestion level of a radio link decreases, the expected user experience of a connectivity mode utilizing the radio link may increase.

In various instances, the network condition(s) may include a latency of the first radio link 204 and/or a latency of the second radio link 208. As used herein, the term "latency" can refer to a time delay between a time at which a signal is transmitted and a time at which a signal is received. A latency can be in the form of a one-way latency, a round-trip latency, or a combination thereof. In some cases, round-trip latency can be determined by performing a ping operation. In a ping operation (e.g., such as the ping operation defined in the Internet Control Message Protocol (ICMP)), a source can transmit an echo request to a destination (e.g., a node in a network), which causes the destination to transmit an echo response to the source. A time delay between the time at which the source transmits the echo response and the time at which the source receives the echo response can be defined as the round-trip latency associated with the destination.

In various implementations, the latency of the first radio link 204 can be inversely proportional to the metric indicating the user experience associated with the dual connectivity mode and can be inversely proportional to the metric indicating the user experience associated with the single connectivity mode via the first radio link 204. In particular implementations, the latency of the second radio link 208 can be inversely proportional to the metric indicating the user experience associated with the dual connectivity mode and can be inversely proportional to the metric indicating the user experience associated with the single connectivity mode via the second radio link 208. Accordingly, as the latency of a radio link increases, the expected user experience of a connectivity mode utilizing the radio link may decrease. However, as the latency of a radio link decreases, the expected user experience of a connectivity mode utilizing the radio link may increase.

In certain examples, the network condition(s) may include a dynamic power sharing condition of the RAN 106. As used herein, the term "dynamic power sharing condition" can refer to an amount of transmission power allocated to a system or a device configured to transmit signals wirelessly for a given time. In some examples, a regional regulatory agency (such as the Federal Communications Commission (FCC) in the United States) establishes a limit to an amount of transmission power that can be utilized by all transmitters located in a particular geographical region to transmit wireless signals of a given frequency band during a given time period. That is, multiple devices and systems (e.g., RANs, UEs, etc.) in a region may have to share a limited amount of transmission power allocated to transmitters in the region. In some cases, a central authority may dynamically allocate an amount of transmission power to each of the devices and systems in the region. For example, a controller connected to multiple RANs may dynamically allocate an amount of power to each of the RANs for a given transmission interval. In some examples, a RAN may dynamically allocate an amount of power to each of multiple UEs located in the RAN's coverage area. In particular instances, a controller connected to multiple RANs may dynamically allocate an amount of power to each of multiple UEs located in overlapping coverage areas of the multiple RANs. A device or system may determine an allocated amount of power by receiving a message (e.g., transmitted data) from the allocating entity. A device or system may limit the amount of power it uses to transmit wireless signals to the amount of power allocated to the device or system. In some cases, an allocated transmission power is specific to a time interval.

In various implementations, an allocated transmission power of the RAN 106 may be directly proportional to the metric indicating the user experience associated with the dual connectivity mode and may be inversely proportional to the metrics indicating the user experiences associated with the single connectivity modes. Accordingly, as the allocated transmission power of the RAN 106 is more restricted, the dual connectivity mode may be more likely to be associated with the best user experience than either of the single connectivity modes.

In particular implementations, the connectivity mode of the second UE 104 can be selected by comparing a single type of network characteristic to a threshold. For example, the dual connectivity mode can be selected if the available capacity of the first radio link 204 exceeds a threshold, if the congestion level of the first radio link 204 is under a threshold, if the latency of the first radio link 204 is under a threshold, or if a dynamic power sharing condition of the first radio link 204 is over a threshold. In some instances, the dual connectivity mode can be selected if the available capacity of the second radio link 208 exceeds a threshold, if the congestion level of the second radio link 208 is under a threshold, if the latency of the second radio link 208 is under a threshold, or if a dynamic power sharing condition of the second radio link 208 is over a threshold.

In various implementations, the second UE 104 can select the connectivity mode by deriving the network characteristic(s) based on at least one signal received from the RAN 106. For instance, the second UE 104 can derive a latency associated with the first radio link 204 by pinging the first transceiver 202 over the first radio link 204. In some implementations, the second UE 104 can determine the network characteristic(s) based on data from the RAN 106. For example, the RAN 106 may transmit a message to the first UE 102 that indicates a congestion level of the second radio link 208.

According to some implementations, if the dual connectivity mode is selected for the second UE 104, a transmission interval for the second UE 104 can be intelligently selected and scheduled. For instance, a transmission interval for uplink or downlink transmissions over the first radio link 204 can be scheduled, a transmission interval for uplink or downlink transmissions over the second radio link 208 can be scheduled, or both. A transmission interval can be scheduled based on any of the network conditions described above. In some examples, an uplink transmission interval for the first radio link 204 is scheduled to at least partially overlap with an uplink transmission interval for the second radio link 208 when an available capacity of the RAN 106 and/or the external network(s) 210 exceeds a threshold, when a congestion level of the RAN 106 and/or the external network(s) 210 is below a threshold, when a latency of the RAN 106 and/or the external network(s) is below a threshold, or the like. In some cases, a time period at which the uplink transmission interval for the first radio link 204 and the uplink transmission interval for the second radio link 208 overlap can be at least partially proportional to an available capacity and/or dynamic power sharing condition of the RAN 106 and/or the external network(s) 210, inversely proportional to a congestion level and/or a latency of the RAN 106 and/or the external network(s) 210, or both. Accordingly, throughput between the external network(s) 210 and the second UE 104 can be maximized when the RAN 106 and/or the external network(s) 210 are relatively unburdened.

According to various implementations, the environment 200 can intelligently select connectivity modes for devices connected to the RAN 106 in order to maximize user experience and network capacity. Furthermore, the environment 200 can intelligently schedule transmission intervals for dual connections in order to maximize user experience and network capacity.

Figure 3:
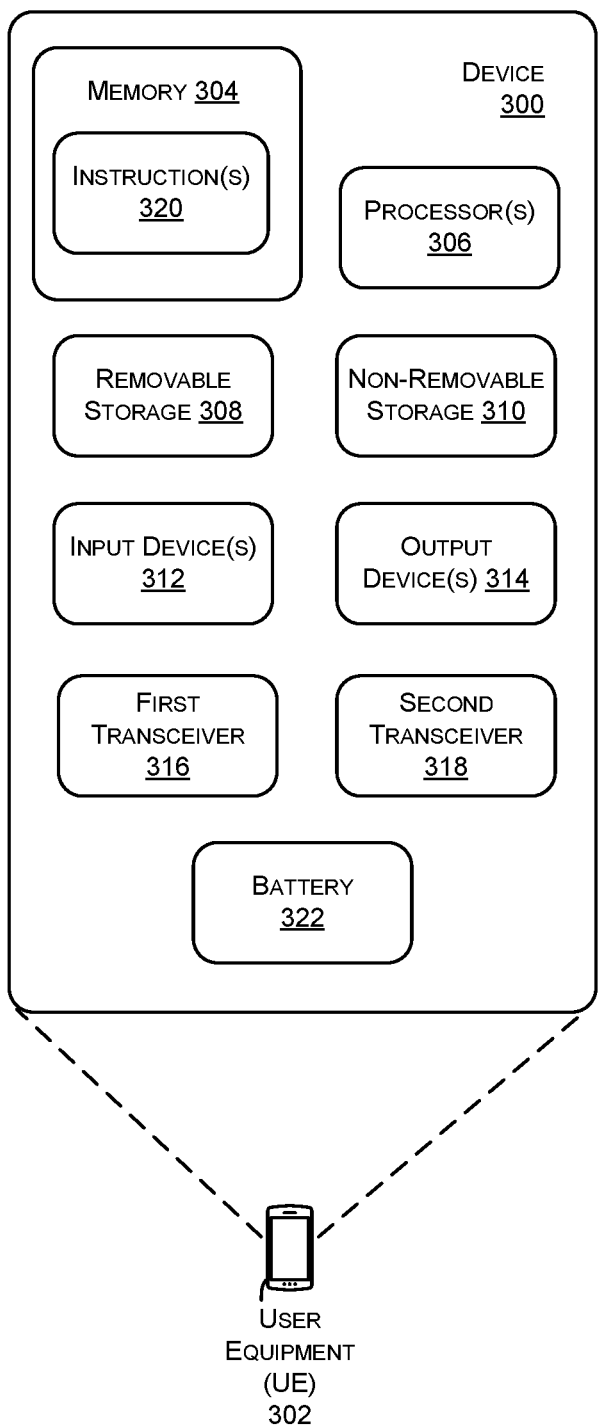
FIG. 3 illustrates an example of a device in a UE.

FIG. 3 illustrates an example of a device 300 in a User Equipment (UE) 302, such as the first UE 102 or the second UE 104 illustrated in FIGS. 1 and 2.

The device 300 includes any of memory 304, processor(s) 306, removable storage 308, non-removable storage 310, input device(s) 312, output device(s) 314, and transceiver(s) 316. The device 300 may be configured to perform various methods and functions disclosed herein. In some cases, various components of the device 300 can be distributed across multiple devices or systems.

The memory 304 may include instruction(s) 320. The instruction(s) 320 may include at least one of component(s), program(s), database(s), software, operating system(s), etc. In some implementations, the instruction(s) 320 include instructions that are executed by processor(s) 306 and/or other components of the device 300. In some cases, the instruction(s) 320, when executed by the processor(s) 306, may cause the processor(s) 306 to perform intelligent connectivity mode selection and/or intelligent transmission interval scheduling.

In some embodiments, the processor(s) 306 include a Central Processing Unit (CPU), a Graphics Processing Unit (GPU), or both CPU and GPU, or other processing unit or component known in the art.

The device 300 may also include additional data storage devices (removable and/or non-removable) such as, for example, magnetic disks, optical disks, or tape. Such additional storage is illustrated in FIG. 3 by removable storage 308 and non-removable storage 310. Tangible computer-readable media can include volatile and non-volatile, removable and non-removable media implemented in any method or technology for storage of information, such as computer readable instructions, data structures, program modules, or other data. The memory 304, the removable storage 308, and the non-removable storage 310 are all examples of computer-readable storage media. Computer-readable storage media include, but are not limited to, Random Access Memory (RAM), Read-Only Memory (ROM), Electrically Erasable Programmable Read-Only Memory (EEPROM), flash memory, or other memory technology, Compact Disk Read-Only Memory (CD-ROM), Digital Versatile Discs (DVDs), Content-Addressable Memory (CAM), or other optical storage, magnetic cassettes, magnetic tape, magnetic disk storage or other magnetic storage devices, or any other medium which can be used to store the desired information and which can be accessed by the device 300. Any such tangible computer-readable media can be part of the device 300.

The device 300 may be configured to communicate over a telecommunications network using any common wireless and/or wired network access technology. Moreover, the device 300 may be configured to run any compatible device Operating System (OS), including but not limited to, Microsoft Windows Mobile, Google Android, Apple iOS, Linux Mobile, as well as any other common mobile device OS.

The device 300 also can include input device(s) 312, such as a keypad, a cursor control, a touch-sensitive display, voice input device, etc., and output device(s) 314 such as a display, speakers, printers, etc. These devices are well known in the art and need not be discussed at length here.

As illustrated in FIG. 3, the device 300 also includes first and second wireless transceivers 316 and 318. In some examples, the first wireless transceiver 316 may be configured to communicate via a first radio technology (e.g., via the first radio link 204 described above with reference to FIG. 2). In some examples, the second wireless transceiver 318 may be configured to communicate via a second radio technology (e.g., the second radio link 208 described above with reference to FIG. 2). According to some implementations, the first wireless transceiver 316 may be configured to transmit and receive wireless signals in a first frequency range, and the second wireless transceiver 318 may be configured to transmit and receive wireless signals in a second frequency range. The first and second frequency ranges may be different. For example, the first frequency range may include one or more Long Term Evolution (LTE) bands and exclude any 5G-specific (e.g., millimeter wave) bands, whereas the second frequency range may include one or more 5G-specific bands.

In particular implementations, either or both of the first and second transceivers 316 and 318 can include a network interface card (NIC), a network adapter, a Local Area Network (LAN) adapter, or a physical, virtual, or logical address to connect to various network components, for example. To increase throughput when exchanging wireless data, each of the first and second transceivers 316 and 318 can utilize multiple-input/multiple-output (MIMO) technology. Either or both of the first and second transceivers 316 and 318 can comprise any sort of wireless transceivers capable of engaging in wireless, radio frequency (RF) communication. Either or both of the first and second transceivers 316 and 318 can also include other wireless modems, such as a modem for engaging in Wi-Fi, WiMAX, Bluetooth, infrared communication, and the like. The first and second transceivers 316 and 318 may include transmitter(s), receiver(s), or both.

The device 300 may also include at least one battery 322. The battery 322 may be configured to power various components of the device 300, such as any of the memory 304, the processor(s) 306, the removable storage 308, the non-removable storage 310, the input device(s) 312, the output device(s) 314, the first transceiver 316, the second transceiver 318, or any other component of the device 300. In some examples, the battery 322 actively powers the first transceiver 316 and the second transceiver 318 when the device 300 is dual connected to the first radio network and the second radio network. In some cases, the battery 322 actively powers the first transceiver 316 without powering the second transceiver 318 when the device 300 is singularly connected to the first radio network. In certain instances, the battery 322 actively powers the second transceiver 318 without powering the first transceiver 316 when the device 300 is singularly connected to the second radio network.

In various implementations, the battery 322 can include one or more electrochemical cells. The battery 322 can include one or more primary cells and/or one or more secondary (i.e., rechargeable) cells. In some instances, the battery 322 can include any of a lead-acid battery, a nickel-cadmium battery, a nickel-zinc battery, a nickel metal hydride battery, a lithium-ion battery, and the like.

According to various implementations, the battery 322 may be, or at least include, a rechargeable battery. Various components in the device 300 may draw stored energy from the battery 322. In addition, the stored energy in the battery 322 may be replenished when the battery 322 is connected to a power source. In some examples, the power source is external to the device 300. For instance, the battery 322 may be recharged by being connected to any of an external battery, an external power generator, an external electrical grid, an external dynamo, an external solar panel, a Wireless Power Transfer (WPT) device (e.g., an inductive charger wirelessly coupled to a coil in the device 300), and the like. Although not illustrated in FIG. 3, in certain examples, the power source is at least partially internal to the device 300. For instance, the device 300 may include a solar panel configured to recharge the battery 322.

In particular instances, the device 300 can track an amount of energy stored in the battery 322 in the real time. In some implementations, the instruction(s) 320 may cause the processor(s) 306 to repeatedly (e.g., periodically) determine the amount of energy stored in the battery 322.

In various implementations, a connectivity mode for the device 300 can be intelligently selected based for the device 300. In various examples, a metric indicating an expected user experience associated with the dual connectivity mode, a metric indicating an expected user experience associated with a single connectivity mode via a first radio link connected to the first transceiver 316, and a metric indicating an expected user experience associated with a single connectivity mode via a second radio link connected to the second transceiver 318 can be calculated. In particular implementations, the connectivity mode associated with the highest metric can be selected.

The metrics may be based, at least in part, on the one or more device characteristics associated with the device 300. The one or more device characteristics may include any of a radio condition experienced by the device 300, a location of the device 300, a trajectory of the device, a dynamic power sharing condition of the device 300, the battery level of the device 300, a processing load on the device 300, and the like.

The radio condition experienced by the device 300 may refer to a quality or strength of a radio signal received by the first transceiver 316, the second transceiver 318, or any other receiver in the device 300. In various implementations, the radio condition of the radio signal received by the first transceiver 316 is directly proportional to the metric indicating the user experience associated with the dual connectivity mode and is directly proportional to the metric indicating the user experience associated with the single connectivity mode via the first transceiver 316. In particular implementations, the radio condition of the radio signal received by the second transceiver 318 is directly proportional to the metric indicating the user experience associated with the dual connectivity mode and is directly proportional to the metric indicating the user experience associated with the single connectivity mode via the second transceiver 318. Accordingly, as the radio condition of a signal received by a particular transceiver increases, the expected user experience of a connectivity mode utilizing the particular transceiver also increases. However, as the radio condition decreases, the expected user experience of a connectivity mode utilizing the particular transceiver also decreases.

In particular instances, the location of the device 300 may refer to whether the device 300 is located in a mid-cell region or a cell-edge region of a particular coverage area. The location can be determined by determining a strength of a signal received from a RAN affiliated with the particular coverage area, by using a Global Positioning System (GPS) module included in the device 300, or the like. In some implementations, the metric associated with the dual connectivity mode is greater than the metrics associated with the single connectivity modes when the device 300 is in the mid-cell region than when the device 300 is in the cell-edge region. In some examples, the metrics associated with the single connectivity modes are greater than the metric associated with the dual connectivity mode when the device 300 is in the cell-edge region and are less than the metric associated with the dual connectivity mode than when the device 300 is in the mid-cell region. According to some implementations, a distance between the device 300 and the RAN (estimated, e.g., by the signal strength) can be directly proportional to the metric associated with the dual connectivity mode, and can be inversely proportional to the metrics associated with the single connectivity modes.

The trajectory of the device may refer to a predicted location of the device 300 with respect to time. For instance, the device 300 may determine its trajectory by determining that it is located in a first part of a coverage area associated with a specific radio network and is moving toward a second part of the coverage area at a particular pace. In particular examples, the metric associated with the dual connectivity mode is greater than the metrics associated with the single connectivity modes in circumstances when the device 300 is moving toward the mid-cell region, and is less than the metrics associated with the single connectivity modes in circumstances when the device 300 is moving toward the cell-edge region or is moving out of the coverage area.

The dynamic power sharing condition of the device 300 may refer to how much shared transmission power the device 300 has been allocated. In particular implementations, the transmission power allocated to the device 300 is directly proportional to the metric associated with the dual connectivity mode. In some cases, when the amount of allocated transmission power exceeds a threshold, the device 300 may establish a dual connection with the two radio links via the first transceiver 316 and the second transceiver 318. When the amount of allocated transmission power does not exceed the threshold, the device 300 may establish a singular connection with one of the radio links using the first transceiver 316 or the second transceiver 318.

As used herein, the battery level may refer to the amount of remaining energy stored in the battery 322. In particular implementations, the battery level may be directly proportional to the metric associated with the dual connectivity mode. Accordingly, in some implementations, the dual connectivity mode can be more likely than the single connectivity modes to increase user experience when the battery 322 is fully charged.

The processing load may be defined as an amount of energy utilized by the processor(s) 306, a number of CPUs activated in the processor(s) 306, another indicator of a load on the processor(s) 306, or a combination thereof. The processing load may be associated with a rate at which the battery level of the device 300 is being drained. In particular implementations, the processing load may be inversely proportional to the metric associated with the dual connectivity mode. In some examples, the device 300 may determine to establish a dual connection with two radio networks when the processing load does not exceed a threshold and may determine to establish a singular connection with one radio network when the processing load exceeds the threshold.

According to various implementations in which the device 300 establishes a dual connection with two radio links via the first and second transceivers 316 and 318, transmission intervals may be scheduled based at least in part on one or more of the device characteristics. The device 300 may determine whether to schedule a first transmission interval for the first radio network and a second transmission interval for the second radio network to at least partially overlap or to be staggered in time according to the one or more of the device characteristics. In particular implementations, the transmission intervals may be scheduled to at least partially overlap when (i) the radio condition associated with the first radio link exceeds a threshold and/or the radio condition associated with the second radio link exceeds a threshold, (ii) when the location of the device 300 is in a mid-cell region, (iii) when the trajectory of the device 300 includes a location in the mid-cell region within a predetermined time, (iv) when the shared power allocated to the device 300 exceeds a threshold, (v) when the battery level of the device 300 exceeds a threshold, (vi) when the processing load of the device 300 does not exceed a threshold, or a combination thereof.

In various implementations, the device 300 can intelligently select a connectivity mode and/or intelligently schedule transmission intervals. In some implementations, the device 300 can determine the device characteristic(s) and transmit a report to a RAN indicating the device characteristic(s). The RAN, in turn, can intelligently select the connectivity mode and/or intelligently schedule transmission intervals based, at least in part, on the report indicating the device characteristic(s).

Figure 4:
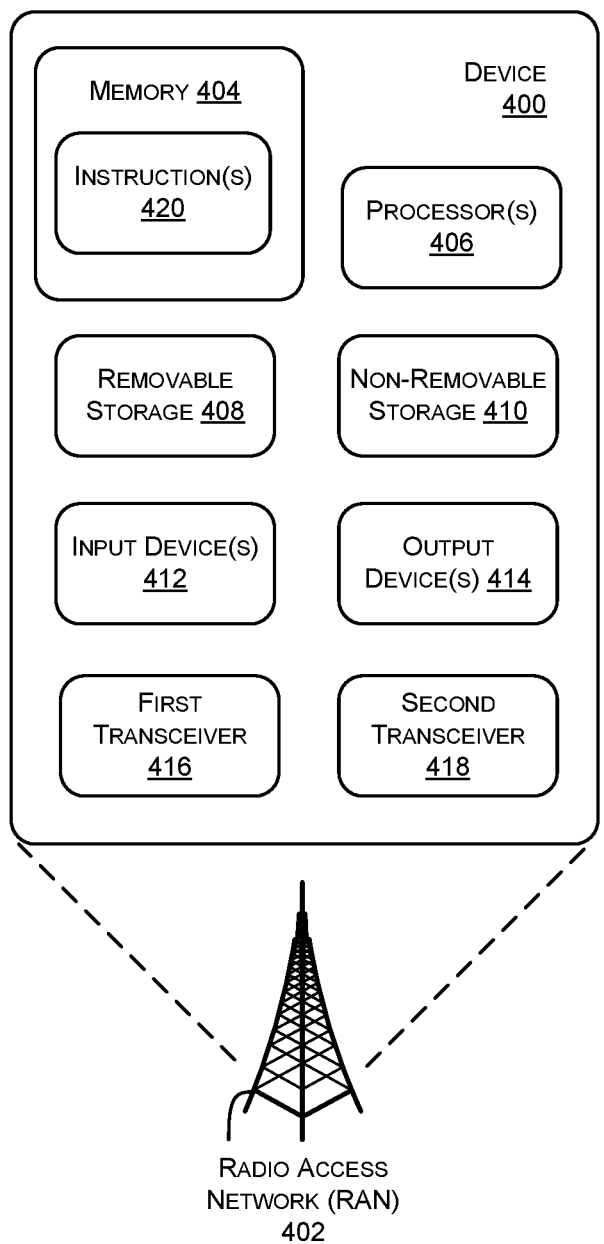
FIG. 4 illustrates an example of a device in a RAN.

FIG. 4 illustrates an example of a device 400 in a Radio Access Network (RAN) 402, such as the RAN 106 illustrated in FIGS. 1 and 2.

The device 400 includes any of memory 404, processor(s) 406, removable storage 408, non-removable storage 410, input device(s) 412, output device(s) 414, and transceiver(s) 416. The device 400 may be configured to perform various methods and functions disclosed herein. In some implementations, the components of the device 400 are distributed across multiple devices.

The memory 404 may include instruction(s) 420. The instruction(s) 420 may include at least one of component(s), program(s), database(s), software, operating system(s), etc. In some implementations, the instruction(s) 420 include instructions that are executed by processor(s) 406 and/or other components of the device 400. In some cases, the instruction(s) 420, when executed by the processor(s) 406, may cause the processor(s) 406 to perform intelligent connectivity mode selection and/or intelligent transmission interval scheduling.

In some embodiments, the processor(s) 406 include a Central Processing Unit (CPU), a Graphics Processing Unit (GPU), or both CPU and GPU, or other processing unit or component known in the art.

The device 400 may also include additional data storage devices (removable and/or non-removable) such as, for example, magnetic disks, optical disks, or tape. Such additional storage is illustrated in FIG. 4 by removable storage 408 and non-removable storage 410. Tangible computer-readable media can include volatile and non-volatile, removable and non-removable media implemented in any method or technology for storage of information, such as computer readable instructions, data structures, program modules, or other data. The memory 404, the removable storage 408, and the non-removable storage 410 are all examples of computer-readable storage media. Computer-readable storage media include, but are not limited to, Random Access Memory (RAM), Read-Only Memory (ROM), Electrically Erasable Programmable Read-Only Memory (EEPROM), flash memory, or other memory technology, Compact Disk Read-Only Memory (CD-ROM), Digital Versatile Discs (DVDs), Content-Addressable Memory (CAM), or other optical storage, magnetic cassettes, magnetic tape, magnetic disk storage or other magnetic storage devices, or any other medium which can be used to store the desired information and which can be accessed by the device 400. Any such tangible computer-readable media can be part of the device 400.

The device 400 may be configured to communicate over a telecommunications network using any common wireless and/or wired network access technology. Moreover, the device 400 may be configured to run any compatible device Operating System (OS), including but not limited to, Microsoft Windows Mobile, Google Android, Apple iOS, Linux Mobile, as well as any other common mobile device OS.

The device 400 also can include input device(s) 412, such as a keypad, a cursor control, a touch-sensitive display, voice input device, etc., and output device(s) 414 such as a display, speakers, printers, etc. These devices are well known in the art and need not be discussed at length here.

As illustrated in FIG. 4, the device 400 also includes first and second wireless transceivers 416 and 418 (e.g., first and second transceivers 202 and 206 described above with reference to FIG. 2). In some examples, the first wireless transceiver 416 may be configured to communicate via a first radio technology (e.g., via the first radio link 204 described above with reference to FIG. 2). In some examples, the second wireless transceiver 418 may be configured to communicate via a second radio technology (e.g., the second radio link 208 described above with reference to FIG. 2). According to some implementations, the first wireless transceiver 416 may be configured to transmit and receive wireless signals in a first frequency range, and the second wireless transceiver 418 may be configured to transmit and receive wireless signals in a second frequency range. The first and second frequency ranges may be different. For example, the first frequency range may include one or more Long Term Evolution (LTE) bands and exclude any 5G-specific (e.g., millimeter wave) bands, whereas the second frequency range may include one or more 5G-specific bands.

In particular implementations, either or both of the first and second transceivers 416 and 418 can include a network interface card (NIC), a network adapter, a Local Area Network (LAN) adapter, or a physical, virtual, or logical address to connect to various network components, for example. To increase throughput when exchanging wireless data, each of the first and second transceivers 416 and 418 can utilize multiple-input/multiple-output (MIMO) technology. Either or both of the first and second transceivers 416 and 418 can comprise any sort of wireless transceivers capable of engaging in wireless, radio frequency (RF) communication. Either or both of the first and second transceivers 416 and 418 can also include other wireless modems, such as a modem for engaging in Wi-Fi, WiMAX, Bluetooth, infrared communication, and the like. The first and second transceivers 416 and 418 may include transmitter(s), receiver(s), or both.

In various implementations, the device 400 can intelligently select a connectivity mode and/or intelligently schedule transmission intervals. In some implementations, the device 400 can determine network characteristic(s) and can receive a report from a device indicating device characteristic(s). The device 400, in turn, can intelligently select the connectivity mode and/or intelligently schedule transmission intervals based, at least in part, on the network characteristic(s) and/or the report indicating the device characteristic(s).

Figure 5:
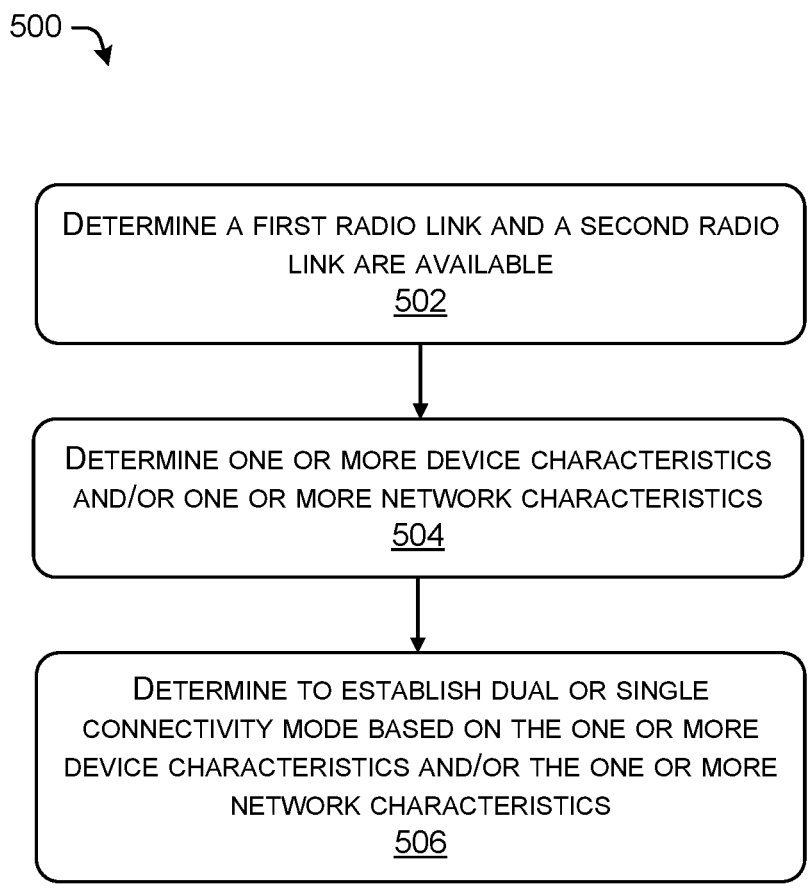
FIG. 5 illustrates an example process for intelligently selecting between dual and single connectivity modes.
Figure 6:
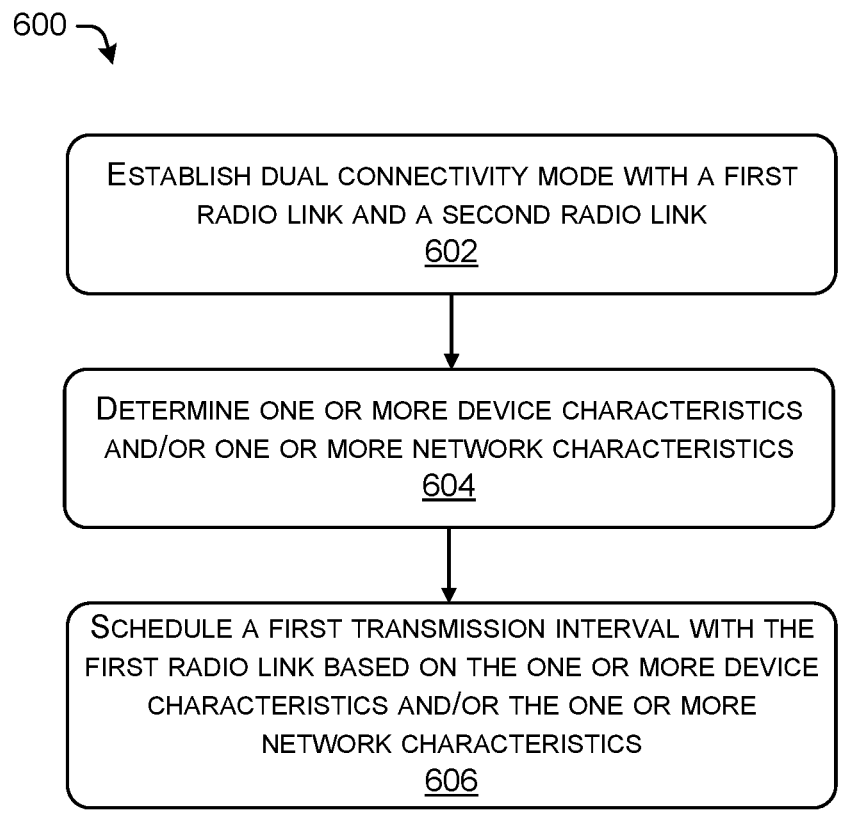
FIG. 6 illustrates an example process for scheduling a transmission interval.
Figure 7:
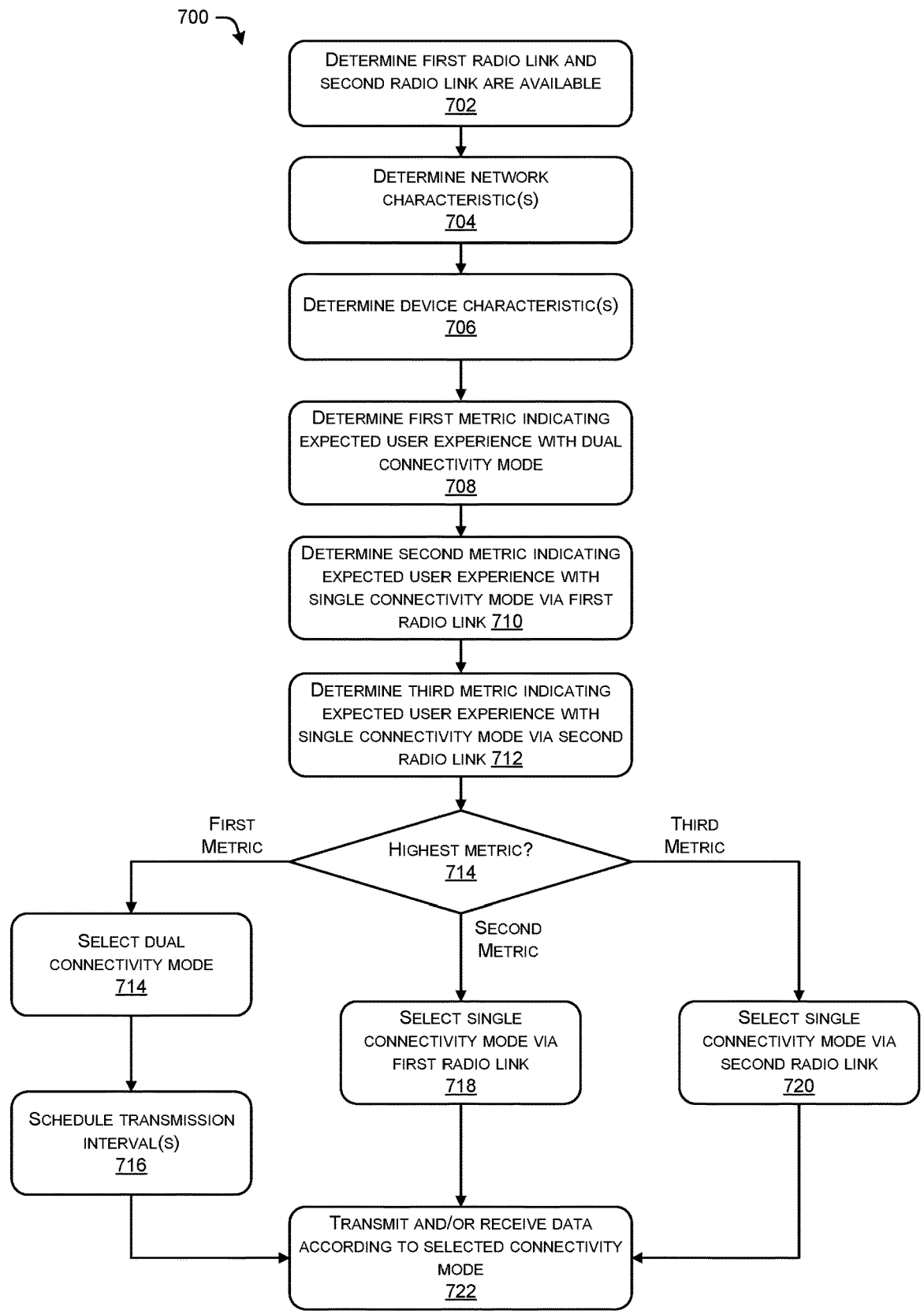
FIG. 7 illustrates an example process for intelligently selecting a connectivity mode.

FIGS. 5-7 illustrate example processes in accordance with various implementations of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates an example process 500 for intelligently selecting between dual and singular connectivity. In some implementations, process 500 is performed by a device (such as any of the first User Equipment (UE) 102, the second UE 104, the device 300, and the UE 302) and/or a Radio Access Network (RAN) (such as any of the RAN 106 and the RAN 402) to which the device is attached.

At 502, a first radio link and a second radio link are determined to be available. For example, a device may be located in a coverage area of a RAN and both the device and the RAN may be capable of utilizing a first radio technology and a second radio technology. In some examples, the first radio technology and the second network technology may utilize different bands of the electromagnetic spectrum. For instance, the first radio network may utilize a $4^{th}$ Generation (4G) radio technology and the second radio network may utilize a $5^{th}$ Generation (5G) radio technology. Accordingly, in some examples, the device and the RAN may both be 4G- and 5G-capable.

In particular implementations, at 502, the device may be attached to the RAN. The device and the RAN may be connected via a first radio link utilizing a 4G radio technology. The device may transmit a message to the RAN indicating that the device is 5G-capable. In some cases, the RAN may transmit a message to the device indicating that a second radio link utilizing a 5G radio technology is available. Either or both of these messages may be Radio Resource Control (RRC) messages exchanged between the device and the RAN, in some cases.

At 504, one or more device characteristics and/or one or more network characteristics are determined. In various implementations, the one or more device characteristics can include at least one characteristic of the device. The one or more device characteristics may include any of a radio condition experienced by the device, a location of the device, a trajectory of the, a dynamic power sharing condition of the device, the battery level of the device, a processing load on the device, and the like. In some cases, the device may determine the device characteristic(s) and transmit a report to the RAN indicating the device characteristic(s). In some cases, the report is transmitted over a radio link that has already been established between the device and the RAN during an attachment process.

In some examples, the one or more network characteristics can include an available capacity, a congestion level, a latency, a dynamic power sharing condition, and the like. The one or more network characteristics may be indicative of the first radio link utilizing the 4G radio technology and/or a second radio link utilizing the 5G radio technology. According to particular implementations, the RAN may determine the network characteristic(s) and may transmit a report to the device indicating the network characteristic(s)

According to some implementations, the one or more network characteristics can be derived from at least one signal transmitted between the RAN and the device. In some cases, the one or more network characteristics can be derived based on a quality of the at least one signal. In certain examples, the one or more network characteristics can be determined based on data contained in the at least one signal.

At 506, a dual or a singular connectivity mode is determined to be established based, at least in part, on the one or more device characteristics and/or the one or more network characteristics. In particular implementations, the connectivity mode is selected by comparing the one or more device characteristics and/or the one or more network characteristics to a particular threshold. For example, the dual connectivity mode can be selected if the available capacity of one of the first and second radio links exceeds a particular threshold.

In some examples, a metric indicating an expected user experience associated with the dual connectivity mode, a metric indicating an expected user experience associated with a single connectivity mode via the first radio link, and a metric indicating an expected user experience associated with a single connectivity mode via the second radio link are calculated. The metrics may be based on the device characteristic(s) and/or the network characteristic(s). The connectivity mode associated with the highest metric may be selected.

In particular implementations, the selected connectivity mode can be implemented between the device and the RAN. In some cases, data can be transmitted between the device and the RAN according to the selected connectivity mode. For instance, if the dual connectivity mode is selected, the device may transmit uplink data to the RAN via the first radio link and the second radio link.

FIG. 6 illustrates an example process 600 for scheduling a transmission interval. In some implementations, process 600 is performed by a device (such as any of the first User Equipment (UE) 102, the second UE 104, the device 300, the UE 302, or the like) and/or a Radio Access Network (RAN) (such as any of the RAN 106 and the RAN 402) to which the device is attached.

At 602, dual connectivity mode is established with a first radio link and a second radio link. In particular implementations, a split radio bearer may be established between the device and the RAN. In various implementations, the first radio link may utilize a first radio technology and the second radio link may utilize a second network technology. In some examples, the first radio technology and the second network technology may utilize different bands of the electromagnetic spectrum. For instance, the first radio network may utilize a $4^{th}$ Generation (4G) radio technology and the second radio network may utilize a $5^{th}$ Generation (5G) radio technology. Dual connectivity may be established by attaching to both the first radio network and the second radio network.

At 604, one or more device characteristics and/or one or more network characteristics are determined. In various implementations, the one or more device characteristics can include at least one characteristic of the device. The one or more device characteristics may include any of a radio condition experienced by the device, a location of the device, a trajectory of the, a dynamic power sharing condition of the device, the battery level of the device, a processing load on the device, and the like. In some cases, the device may determine the device characteristic(s) and transmit a report to the RAN indicating the device characteristic(s). In some cases, the report is transmitted over a radio link that has already been established between the device and the RAN during an attachment process.

In some examples, the one or more network characteristics can include an available capacity, a congestion level, a latency, a dynamic power sharing condition, and the like. The one or more network characteristics may be indicative of the first radio link utilizing the 4G radio technology and/or a second radio link utilizing the 5G radio technology. According to particular implementations, the RAN may determine the network characteristic(s) and may transmit a report to the device indicating the network characteristic(s)

According to some implementations, the one or more network characteristics can be derived from at least one signal transmitted between the RAN and the device. In some cases, the one or more network characteristics can be derived based on a quality of the at least one signal. In certain examples, the one or more network characteristics can be determined based on data contained in the at least one signal.

At 606, a first transmission interval with the first radio link is scheduled based, at least in part, on the one or more device characteristics and/or the one or more network characteristics. The first transmission interval may be a scheduled interval for uplink and/or downlink transmission between the device and the RAN via the first radio link.

In various implementations, the first transmission interval is scheduled in relation to a second transmission interval with the second radio link. The first transmission interval may be scheduled to at least partially overlap with the second transmission interval or to be staggered with the second transmission interval, based on the one or more device characteristics and/or the one or more network characteristics. For instance, the first transmission interval may be scheduled to at least partially overlap with the second transmission interval when the battery level of the device exceeds a particular threshold.

In particular implementations, the device and/or the RAN can transmit data according to the scheduled first transmission interval. For instance, if the first transmission interval is scheduled to at least partially overlap with the second transmission interval, the device may transmit uplink data to the RAN simultaneously via the first radio link and the second radio link.

FIG. 7 illustrates an example process 700 for intelligently selecting a connectivity mode. In some implementations, process 700 is performed by a device (such as any of the first User Equipment (UE) 102, the second UE 104, the device 300, the UE 302, or the like) and/or a Radio Access Network (RAN) (such as any of the RAN 106 and the RAN 402) to which the device is attached.

At 702, first and second radio links are determined to be available. In various implementations, a device is attached to a RAN. The first and second radio links may connect the device and the RAN to each other. The first and second radio links may be determined to be available if the device is capable of transmitting and/or receiving data over the first and second radio links. For instance, if the first radio link utilizes a first radio technology (e.g., a $4^{th}$ Generation (4G) radio technology) and the second radio link utilizes a second radio technology (e.g., a $5^{th}$ Generation (5G) radio technology), the device may be configured to transmit and/or receive data via the first radio technology and the second radio technology. Furthermore, the device may be located in a coverage area of the RAN.

At 702, one or more network characteristics are determined. The network characteristic(s) may be characteristics of any of the RAN, the first radio link, the second radio link, and the like. In various examples, the network characteristic(s) may include any of an available capacity, a congestion level, a latency, an allocated transmission power, and the like.

At 706, one or more device characteristics are determined. The device characteristic(s) may be characteristics of the device attached to the RAN. In various examples, the device characteristic(s) may include any of a radio condition, a location of the device, a battery level of the device, a processing load on the device, an allocated transmission power, and the like.

At 708, a first metric indicating an expected user experience with a dual connectivity mode is determined. In various implementations, the first metric may be based, at least in part, on any of the network characteristic(s) and/or any of the device characteristic(s). For instance, the first metric may increase as any of an available capacity of the first radio link, an available capacity of the second radio link, an allocated transmission power of the RAN, a radio condition of a signal received by the device over the first radio link, a radio condition of a signal received by the device over the second radio link, a battery level of the device, and an allocated transmission power of the device increase. In some examples, the first metric may decrease as any of a congestion level of the first radio link, a congestion level of the second radio link, a latency of the first radio link, a latency of the second radio link, a distance between the device and the RAN, and a processing load on the device increase.

At 710, a second metric indicating an expected user experience with a single connectivity mode via the first radio link is determined. In various implementations, the second metric may be based, at least in part, on any of the network characteristic(s) and/or any of the device characteristic(s). For instance, the second metric may increase as any of the available capacity of the first radio link, the radio condition of the signal received by the device over the first radio link, the congestion level of the second radio link, the latency of the second radio link, the distance between the device and the RAN, and the processing load on the device increase. In some examples, the second metric may decrease as any of the allocated transmission power of the RAN, the radio condition of the signal received by the device over the second radio link, the battery level of the device, the allocated transmission power of the device, the congestion level of the first radio link, and the latency of the first radio link increase.

At 712, a third metric indicating an expected user experience with a single connectivity mode via the second radio link is determined. In various implementations, the third metric may be based, at least in part, on any of the network characteristic(s) and/or any of the device characteristic(s). For instance, the third metric may increase as any of the available capacity of the second radio link, the radio condition of the signal received by the device over the second radio link, the congestion level of the first radio link, the latency of the first radio link, the distance between the device and the RAN, and the processing load on the device increase. In some examples, the second metric may decrease as any of the radio condition of the signal received by the device over the first radio link, the allocated transmission power of the RAN, the battery level of the device, the allocated transmission power of the device, the congestion level of the second radio link, and the latency of the second radio link increase.

At 714, a highest metric is determined. The highest metric may be among the first metric, the second metric, and the third metric. The highest metric may be associated with a connectivity mode associated with a maximal expected user experience.

If the first metric is determined to be the highest metric at 714, the process 700 proceeds to 714. At 714, the dual connectivity mode is selected. Accordingly, a split radio bearer including the first radio link and the second radio link can be established between the device and the RAN. The device may activate a transceiver configured to communicate via the first radio link and a transceiver configured to communicate via the second radio link. In implementations in which the RAN selects the connectivity mode, the RAN may cause the device to establish the selected connectivity mode by transmitting an indication of the selected connectivity mode to the device.

At 716, one or more transmission intervals are determined. The transmission interval(s) may include at least one first transmission interval for transmissions over the first radio link and/or at least one second transmission interval for transmissions over the second radio link. The transmission interval(s) may include at least one uplink transmission interval, at least one downlink transmission interval, or a combination thereof.

In particular implementations, the first transmission interval(s) and the second transmission interval(s) may be scheduled to at least partially overlap or be at least partially staggered in the time domain based on the device condition(s). In some cases, a fourth metric based on the device condition(s) is calculated and compared to a threshold. In some implementations, the fourth metric may increase as any of the radio condition of the signal received by the device over the first radio link, the radio condition of the signal received by the device over the second radio link, the battery level of the device, and an allocated transmission power of the device increase. In some cases, the fourth metric may decrease as any of the radio condition of the signal received by the device over the first radio link, the radio condition of the signal received by the device over the second radio link, the battery level of the device, and an allocated transmission power of the device increase. If the fourth metric exceeds the threshold, the transmission interval(s) may be scheduled to at least partially overlap. If the fourth metric does not exceed the threshold, the transmission interval(s) may be scheduled to be staggered in the time domain.

In various implementations, the transmission interval(s) are scheduled in advance. For example, an uplink transmission interval for the first radio link is scheduled at a time that occurs prior to the uplink transmission interval. An entity that schedules the transmission interval(s) (e.g., a first one of the RAN or the device attached to the RAN) may send another entity (e.g., a second one of the RAN or the device) an indication of the scheduled transmission interval(s). Accordingly, the device and the RAN may coordinate their transmissions according to the scheduled transmission interval(s).

If the second metric is determined to be the highest metric at 714, the process 700 proceeds to 718. At 718, the single connectivity mode via the first radio link is selected. In various implementations, the device may activate the transceiver configured to communicate via the first radio link and may deactivate the transceiver configured to communicate via the second radio link. Accordingly, in some cases, the device may conserve power in the single connectivity mode. In implementations in which the RAN selects the connectivity mode, the RAN may cause the device to establish the selected connectivity mode by transmitting an indication of the selected connectivity mode to the device.

If the third metric is determined to be the highest metric at 714, the process 700 proceeds to 720. At 720, the single connectivity mode via the second radio link is selected. In various implementations, the device may activate the transceiver configured to communicate via the second radio link and may deactivate the transceiver configured to communicate via the first radio link. Accordingly, in some cases, the device may conserve power in the single connectivity mode. In implementations in which the RAN selects the connectivity mode, the RAN may cause the device to establish the selected connectivity mode by transmitting an indication of the selected connectivity mode to the device.

Regardless of the highest metric selected at 714, the process 700 converges to 722. At 722, data is transmitted and/or received according to the selected connectivity mode. In some cases, uplink data is transmitted from the device to the RAN via the first radio link and/or the second radio link according to the selected mode. In circumstances in which transmission interval(s) have been scheduled in advance, the data may be transmitted according to the scheduled transmission interval(s).

Accordingly, process 700 enables intelligent connectivity mode selection. In some cases, process 700 enables intelligent transmission interval scheduling.

Example Clauses

A. A method including: receiving, via a 4th Generation (4G) radio link, an indication that a device is 5th Generation (5G)-capable; determining a congestion level of a 5G radio link; in response to determining that the congestion level of the 5G radio link is less than a first threshold, selecting a dual connectivity mode; causing the device to connect to the 4G radio link and the 5G radio link; and receiving uplink data from the device via the 4G radio link and the 5G radio link.

B. The method of A further including receiving an indication of a battery level of the device; and in response to determining the battery level of the device exceeds a second threshold, scheduling a first uplink transmission interval corresponding to the 4G radio link and a second uplink transmission interval corresponding to the 5G radio link to overlap in a time domain, wherein receiving the uplink data from the device includes receiving the uplink data via the 4G radio link according to the first uplink transmission interval and via the 5G radio link according to the second uplink transmission interval.

C. The method of A or B further including receiving, from the device, an indication of a transmission power of a signal received by the device; and determining that the device is located in a mid-cell region based at least in part on the indication of the transmission power, wherein selecting dual connectivity mode is in response to determining that the device is located in the mid-cell region.

D. A method including determining at least one first network characteristic of a first radio link corresponding to a first radio technology; determining, based on the at least one first network characteristic, a selected connectivity mode among a dual connectivity mode utilizing the first radio link and a second radio link corresponding to a second radio technology, a first single connectivity mode utilizing the first radio link, and a second single connectivity mode utilizing the second radio link; and causing a device to connect to at least one of the first radio link and the second radio link via the selected connectivity mode.

E. The method of D wherein the at least one first network characteristic includes at least one of an available capacity of the first radio link, a congestion level of the first radio link, a latency of the first radio link, and an allocated transmission power of the first radio link.

F. The method of D or E wherein the first radio technology is a 5th Generation (5G) radio access technology and the second radio technology is a 4th Generation (4G) radio access technology.

G. The method of any of D to F, further including: determining at least one second network characteristic of the second radio link, wherein determining the selected connectivity mode includes selecting, based on the at least one second network characteristic, the dual connectivity mode, the first single connectivity mode, or the second single connectivity mode.

H. The method of G, wherein the at least one second network characteristic includes at least one of an available capacity of the second radio link, a congestion level of the second radio link, a latency of the second radio link, and an allocated transmission power.

I. The method of claim any of D to H, further including: determining at least one device characteristic of the device, wherein the at least one device characteristic includes one or more of a radio condition experienced by the device, a location of the device, a trajectory of the device, a dynamic power sharing condition of the device, a battery level of the device, or a processing load on the device.

J. The method of I, wherein determining the selected connectivity mode includes selecting, based on the at least one device characteristic, the dual connectivity mode, the first single connectivity mode, or the second single connectivity mode.

K. The method of any of D to J, further including: in response to causing the device to connect to the first radio link and the second radio link via the dual connectivity mode, scheduling a first uplink transmission interval corresponding to the first radio link based on the at least one device characteristic and scheduling a second uplink transmission interval corresponding to the second radio link based on the at least one device characteristic.

L. The method of K, wherein the first uplink transmission interval and the second uplink transmission interval are scheduled to be staggered in a time domain.

M. The method of any of D to L, wherein determining the selected connectivity mode includes: determining, based on the at least one first network characteristic, a first metric associated with an expected user experience of the device in the dual connectivity mode; determining, based on the at least one first network characteristic, a second metric associated with an expected user experience of the device in the first single connectivity mode; determining, based on the at least one first network characteristic, a third metric associated with an expected user experience of the device in the second single connectivity mode; determining a highest metric among the first metric, the second metric, and the third metric; and selecting a connectivity mode associated with the highest metric as the selected connectivity mode.

N. A method of any of D to M wherein determining the at least one first network characteristic includes receiving an indication of the at least one first network characteristic from a Radio Access Network (RAN).

O. A method of any of D to N further including receiving an attachment request from the device.

P. A method of any of D to N further including transmitting an attachment request to a Radio Access Network (RAN), wherein the RAN is connected to the first radio link and the second radio link.

Q. A method of I or J wherein determining at least one device characteristic of the device includes receiving, from the device, an indication of the at least one device characteristic.

R. A method including determining a first radio link and a second radio link are available; determining one or more device characteristics and/or one or more network characteristics; and determining to establish dual or single connectivity mode based on the one or more device characteristics and/or the one or more network characteristics.

S. A method including establishing a dual connectivity mode with a first radio link and a second radio link; determining one or more device characteristics and/or one or more network characteristics; and scheduling a first transmission interval with the first radio link based on the one or more device characteristics and/or the one or more network characteristics.

T. A non-transitory computer-readable medium storing operations comprising the method of any of A to S.

U. A system including at least one processor; and at least one memory storing instructions executable by the at least one processor, wherein the instructions, when executed by the at least one processor, cause the at least one processor to perform operations including the method of any of A to S.

V. The system of U further including a first transceiver and a second transceiver.

W. The system of U wherein the system is the device.

X. The system of U wherein the system is a Radio Access Network (RAN).

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The terms "based on," "based, at least in part, on," "based at least partly on," and their equivalents, may be used interchangeably throughout the claims and the rest of the disclosure. In addition, the terms "comprising," "including," and their equivalents, may be used interchangeably throughout the claims and the rest of the disclosure.

As recited throughout the claims and the rest of the disclosure, the phrases "any of A, B, and C," "any of A, B, or C," "at least one of A, B, and C," "at least one of A, B, or C," "one or more of A, B, and C," and "one or more of A, B, or C" can be used interchangeably to refer to any combination of A, B, and C. For instance, "any of A, B, and C" can include A; B; C; A and B; A and C; B and C; or A, B, and C.

What is claimed is:

1. A method comprising:
    determining at least one first network characteristic of a first radio link corresponding to a first radio technology;
    determining, based on the at least one first network characteristic, a selected connectivity mode among a dual connectivity mode utilizing the first radio link and a second radio link corresponding to a second radio technology, a first single connectivity mode utilizing the first radio link, and a second single connectivity mode utilizing the second radio link;
    determining, based on the at least one first network characteristic:
        a first metric associated with an expected user experience of a device in a dual connectivity mode;
        a second metric associated with an expected user experience of the device in a first single connectivity mode; and
        a third metric associated with an expected user experience of the device in a second single connectivity mode;
    determining a highest metric among the first metric, the second metric, and the third metric;
    selecting the selected connectivity mode associated with the highest metric as the selected connectivity mode; and
    causing the device to connect to at least one of the first radio link or the second radio link via the selected connectivity mode.

2. The method of claim 1, wherein the at least one first network characteristic comprises at least one of an available capacity of the first radio link, a congestion level of the first radio link, a latency of the first radio link, or an allocated transmission power of the first radio link.

3. The method of claim 1, wherein the first radio technology is a 5th Generation (5G) radio access technology and the second radio technology is a 4th Generation (4G) radio access technology.

4. The method of claim 1, further comprising:
    determining at least one second network characteristic of the second radio link,
    wherein determining the selected connectivity mode comprises selecting, based on the at least one second network characteristic, the dual connectivity mode, the first single connectivity mode, or the second single connectivity mode.

5. The method of claim 4, wherein the at least one second network characteristic comprises at least one of an available capacity of the second radio link, a congestion level of the second radio link, a latency of the second radio link, or an allocated transmission power.

6. The method of claim 1, further comprising:
    determining at least one device characteristic of the device,
    wherein the at least one device characteristic comprises one or more of a radio condition experienced by the device, a location of the device, a trajectory of the device, a dynamic power sharing condition of the device, a battery level of the device, or a processing load on the device.

7. The method of claim 6, wherein determining the selected connectivity mode comprises selecting, based on the at least one device characteristic, the dual connectivity mode, the first single connectivity mode, or the second single connectivity mode.

8. The method of claim 7, further comprising:
    in response to causing the device to connect to the first radio link and the second radio link via the dual connectivity mode, scheduling a first uplink transmission interval corresponding to the first radio link based on the at least one device characteristic and scheduling a second uplink transmission interval corresponding to the second radio link based on the at least one device characteristic.

9. The method of claim 8, wherein the first uplink transmission interval and the second uplink transmission interval are scheduled to be staggered in a time domain.

10. A system comprising:
    at least one processor; and
    at least one memory storing instructions executable by the at least one processor, wherein the instructions, when executed by the at least one processor, cause the at least one processor to perform operations comprising:

determining at least one first network characteristic of a first radio link corresponding to a first radio technology;

determining, based on the at least one first network characteristic, a selected connectivity mode among a dual connectivity mode utilizing the first radio link and a second radio link corresponding to a second radio technology, a first single connectivity mode utilizing the first radio link, and a second single connectivity mode utilizing the second radio link;

determining, based on the at least one first network characteristic:
- a first metric associated with an expected user experience of a device in a dual connectivity mode;
- a second metric associated with an expected user experience of the device in a first single connectivity mode; and
- a third metric associated with an expected user experience of the device in a second single connectivity mode;

determining a highest metric among the first metric, the second metric, and the third metric;

selecting the selected connectivity mode associated with the highest metric as the selected connectivity mode; and causing the device to connect to at least one of the first radio link or the second radio link via the selected connectivity mode.

11. The system of claim 10, wherein the at least one first network characteristic comprises at least one of an available capacity of the first radio link, a congestion level of the first radio link, a latency of the first radio link, and an allocated transmission power of the first radio link.

12. The system of claim 10, wherein the first radio technology is a 5th Generation (5G) radio access technology and the second radio technology is a 4th Generation (4G) radio access technology.

13. The system of claim 10, wherein the operations further comprise:

determining at least one device characteristic of the device, wherein the at least one device characteristic comprises one or more of a radio condition experienced by the device, a location of the device, a trajectory of the device, a dynamic power sharing condition of the device, a battery level of the device, or a processing load on the device.

14. The system of claim 13, wherein determining the selected connectivity mode for the device comprises selecting, based on the at least one device characteristic, the dual connectivity mode, the first single connectivity mode, or the second single connectivity mode.

15. The system of claim 14, wherein the operations further comprise:

in response to causing the device to connect to the first radio link and the second radio link via the dual connectivity mode, scheduling a first uplink transmission interval corresponding to the first network based on the at least one device characteristic and scheduling a second uplink transmission interval corresponding to a second network based on the at least one device characteristic.

16. A non-transitory computer-readable medium having programming instructions stored thereon that, when executed by a computing device, causes the computing device to perform operations comprising:

determining at least one first network characteristic of a first radio link corresponding to a first radio technology;

determining, based on the at least one first network characteristic, a selected connectivity mode among a dual connectivity mode utilizing the first radio link and a second radio link corresponding to a second radio technology, a first single connectivity mode utilizing the first radio link, and a second single connectivity mode utilizing the second radio link;

determining, based on the at least one first network characteristic:
- a first metric associated with an expected user experience of a device in a dual connectivity mode;
- a second metric associated with an expected user experience of the device in a first single connectivity mode; and
- a third metric associated with an expected user experience of the device in a second single connectivity mode;

determining a highest metric among the first metric, the second metric, and the third metric;

selecting the selected connectivity mode associated with the highest metric as the selected connectivity mode; and causing the device to connect to at least one of the first radio link or the second radio link via the selected connectivity mode.

17. The non-transitory computer-readable medium of claim 16, wherein the at least one first network characteristic comprises at least one of an available capacity of the first radio link, a congestion level of the first radio link, a latency of the first radio link, and an allocated transmission power of the first radio link.

18. The non-transitory computer-readable medium of claim 16, wherein the first radio technology is a 5th Generation (5G) radio access technology and the second radio technology is a 4th Generation (4G) radio access technology.

19. The non-transitory computer-readable medium of claim 16, the operations further comprising:

determining at least one second network characteristic of the second radio link, wherein determining the selected connectivity mode comprises selecting, based on the at least one second network characteristic, the dual connectivity mode, the first single connectivity mode, or the second single connectivity mode.

20. The non-transitory computer-readable medium of claim 19, wherein the at least one second network characteristic comprises at least one of an available capacity of the second radio link, a congestion level of the second radio link, a latency of the second radio link, or an allocated transmission power.

* * * * *